US005634774A

United States Patent [19]
Angel et al.

[11] Patent Number: 5,634,774
[45] Date of Patent: Jun. 3, 1997

[54] ROAD VEHICLE-ACTUATED AIR COMPRESSOR

[76] Inventors: Robert C. Angel, 15607 Dysart Rd., Surprise, Ariz. 85374; Jesus Gomez, 13121 W. Sierra Vista, Glendale, Ariz. 85307

[21] Appl. No.: 610,977

[22] Filed: Mar. 1, 1996

[51] Int. Cl.$^6$ ....................... F04B 35/00
[52] U.S. Cl. ............................. 417/229
[58] Field of Search ................ 417/229, 569; 290/1 R

[56] References Cited

U.S. PATENT DOCUMENTS

| | | | |
|---|---|---|---|
| 2,020,361 | 11/1935 | Johnston | 417/229 |
| 4,173,431 | 11/1979 | Smith . | |
| 4,212,598 | 7/1980 | Roche et al. | 417/229 |
| 4,339,920 | 7/1982 | Le Van | 417/229 |
| 4,434,374 | 2/1984 | Lundgren . | |
| 4,980,572 | 12/1990 | Sen . | |
| 5,355,674 | 10/1994 | Rosenberg . | |

FOREIGN PATENT DOCUMENTS

| | | | |
|---|---|---|---|
| 2941079 | 4/1981 | Germany | 417/229 |
| 113069 | 9/1981 | Japan | 417/229 |
| 18467 | 1/1982 | Japan | 417/229 |
| 1602275 | 11/1981 | United Kingdom | 417/229 |

*Primary Examiner*—Louis J. Casaregola
*Assistant Examiner*—Roland G. McAndrews, Jr.
*Attorney, Agent, or Firm*—Patent & Trademark Services; Joseph H. McGlynn

[57] ABSTRACT

A vehicle or pedestrian operated air compressor which utilizes flaps mounted in pairs in a road or pedestrian walkway surface. When traffic moves over the flaps, they move downward to activate a piston which compresses air. The compressed air can be stored in a container and used as needed to generate electricity or activate other machinery.

8 Claims, 1 Drawing Sheet

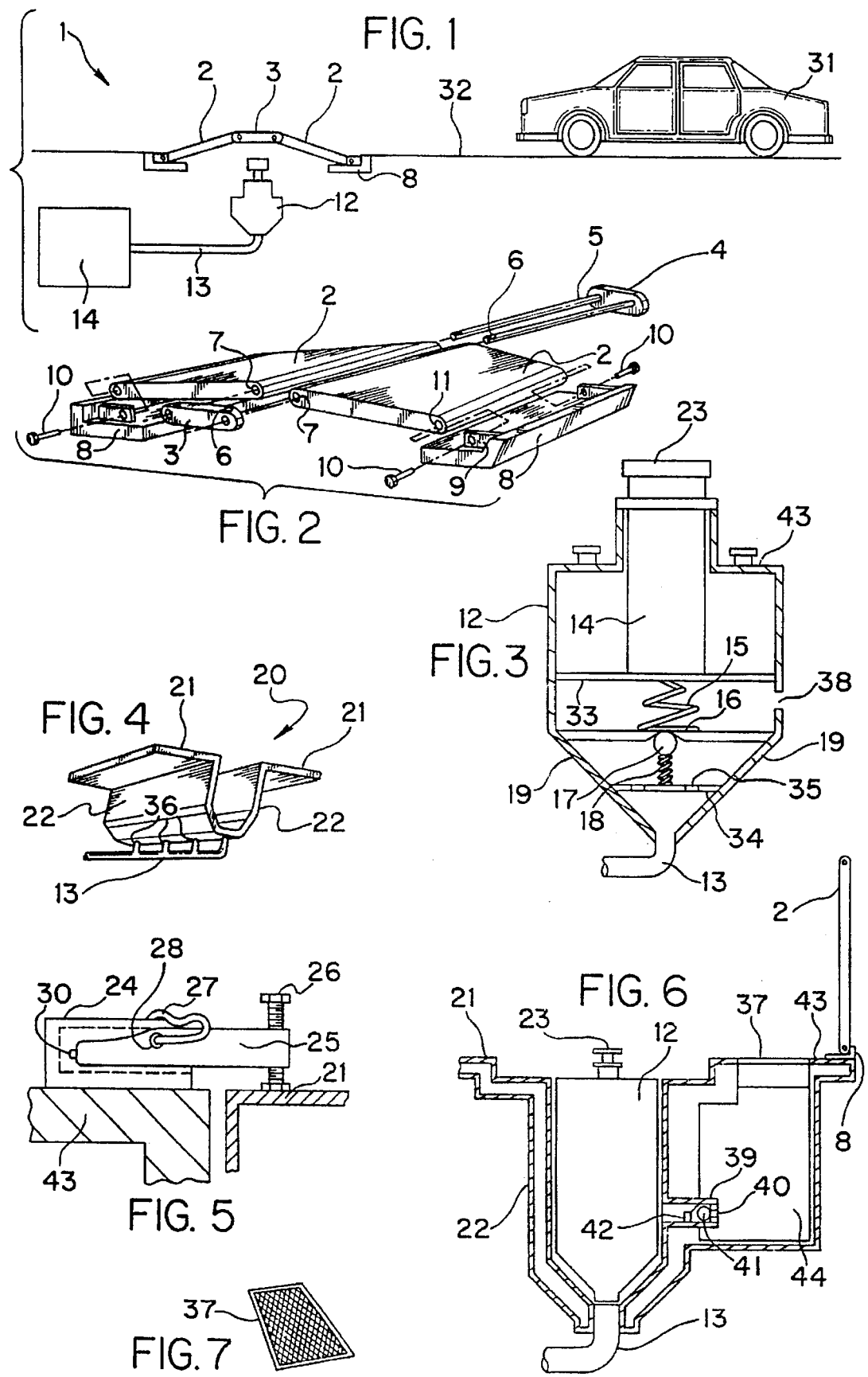

ROAD VEHICLE-ACTUATED AIR COMPRESSOR

BACKGROUND OF THE INVENTION

This invention relates, in general, to air compressors, and, in particular, to vehicle actuated air compressors.

DESCRIPTION OF THE PRIOR ART

In the prior art various types of vehicle or pedestrian actuated air compressors have been proposed. For example, U.S. Pat. No. 4,173,431 discloses an actuator which responds to the motion of vehicles to move a piston which compresses air into a cylinder. The compressed air is then utilized to produce electricity. U.S. Pat. No. 4,434,374 discloses a pedestrian actuated air compressor including a tread plate which actuates a gear generator which stores torque energy. U.S. Pat. No. 4,980,572 discloses underground spinning wheels which are activated by vehicle traffic. Electricity is generated by using the spinning wheels to activate an alternator. U.S. Pat. No. 5,355,674 utilizes a pair of swivel plates in a roadway which are activated by vehicles. The air generated by the plates compress a fluid in a container to store energy.

While all of the prior art devices accomplish the same basic result, i.e. utilizing vehicle or pedestrian traffic to produce and store energy, the prior art devices have many disadvantages such as complicated mechanisms which are difficult to repair and/or replace.

SUMMARY OF THE INVENTION

The present invention utilizes flaps mounted in pairs in a road or pedestrian walkway surface. When traffic moves over the flaps, they move downward to activate a piston which compresses air. The compressed air can be stored in a container and used as needed to generate electricity or activate other machinery.

It is an object of the present invention to provide a vehicle or pedestrian operated air compressor that is easily maintained or repaired.

It is an object of the present invention to provide a vehicle or pedestrian operated air compressor that is inexpensive to manufacture.

It is an object of the present invention to provide a vehicle or pedestrian operated air compressor that eliminates the disadvantages of the prior art.

These and other objects and advantages of the present invention will be fully apparent from the following description, when taken in connection with the annexed drawings.

BRIEF DESCRIPTION OF THE DRAWINGS

FIG. 1 is a schematic view of the present invention.

FIG. 2 is a perspective view of the road flaps of the present invention.

FIG. 3 is a sectional view of the pump of the present invention

FIG. 4 is a perspective view of the pump holding casing of the present invention.

FIG. 5 is a side view of the locking mechanism for holding the pumps in the holding casing.

FIG. 6 is a view of a pump mounted within the holding casing.

FIG. 7 is a view of the filter door.

DESCRIPTION OF THE PREFERRED EMBODIMENT

Referring now to the drawings in greater detail, FIG. 1 shows schematically the basic components of the pump system 1 of the present invention. It should be noted that even though the system is shown mounted in a roadway where vehicles will be traveling, the system, with minor modifications, can be mounted in a sidewalk where it can be operated by pedestrian traffic.

A pair of flaps 2 are pivotably mounted on L-shaped holders 8 by means of bolts 10 which pass through flanges 9 on the holders 8, and then through threaded apertures 11 in the ends of the flaps 2 (see FIG. 2). The flaps are joined together at their adjacent ends by rods 5 permanently attached to a holder 4. The rods are inserted through apertures 7 which extend through the flaps 2. The rods will be long enough to extend through the flaps and a second holder 3 can be placed on the ends of the rods. A pin, not shown, can pass through apertures 6 in the ends of the rods and the holder 3 to lock the rods in the flaps 2. The holders 8 should be permanently mounted in a roadway 32 (or walkway) so the holders are flush with the roadway. The flaps should extend slightly above the roadway so a vehicle 31 will be able to force the flaps downward as it passes over the flaps.

Mounted beneath the flaps 2 are pumps 12. It should be noted that only one pump 12 is shown, but any number of pumps could be used. The pumps are connected by means of tubes or pipes 13 to a storage tank 14 which will store compressed air produced by the pumps. This air will be stored so it can be used immediately or at a later time. The air can be used for purposes such as, but not limited to, generating electrical energy.

Each of the pumps 12 consists of a casing having a shaft 14 with a piston head 23 on one end and a piston plate 33 on the other end. The piston plate should make air tight engagement with the inner walls of the casing, and can have a conventional groove in the circumference of the plate 33 (not shown) with an 0-ring in the groove to insure a positive seal, if necessary. Also, conventional seals (not shown) around the top of the casing where the shaft exits the casing can be used to insure an air tight seal in that location. A spring 15 will return the piston to the up position after each downward stroke.

When the piston is forced down by vehicle or pedestrian pressure on the head 23, the plate 33 will compress air within the casing. As the air is compressed it will force ball valve 17 downward against the pressure of spring 18. This will open valve seat 16 so air can pass into the lower, tapered portion 19 of the casing, through apertures 35 in plate 34, and then into tube 13 and finally into storage tank 14.

When vehicle or pedestrian pressure on the head 23 is released, spring 15 will force the piston into the up position, and at the same time the vacuum inside the casing and spring 18 will force ball valve 17 into seat 16, thereby sealing the passage to the storage tank, and the cycle can be repeated.

FIG. 4 shows the incasing 20 that will be used to secure the pumps 12 beneath the roadway. The incasing 20 consists of a pair of horizontal flanges 21 (see also FIG. 6) which can be mounted in the ground by any conventional method. Attached to these flanges are sidewalls 22 which will conform to the outer walls of the pumps 12. It should be noted that the distances between the pump 12 and the incasing walls 22 have been exaggerated in FIG. 6 for clarity. In actual use the pumps will fit snugly within the incasing. At the bottom of the incasing will be a series of small pipe sections 36 (see FIG. 4) which will connect the pipe 13 to each of the pumps 12 (if more than one pump is used). The incasings 20 can be made any size to accommodate as many pumps 12 as necessary.

In order to secure the pumps 12 within the incasing 20, the latch shown in FIG. 5 is used. The latch will not only secure the pumps 12 within the incasing 20, but will also force the pumps against the bottom of the incasing in order to seal the air exit from the pump to the pipes 36 on the bottom of the incasing.

The latch consists of a body portion 24 attached to the top 23 of the pumps in any conventional manner. Pivotably attached to the body 24 by a pivot pin 30 is an arm 25 which has a bolt 26 threadably attached to one end. After the pumps are placed into the incasing, the arm 25 is pivoted down so the end with the bolt 26 overlies one of the flanges 21, as shown in FIG. 5. Next a spring pin 27 or similar device is inserted through an aperture 28 in the arm 25, and at the same time part of the pin will be forced over the top of the body 24. This will prevent the arm 25 from pivoting away from the body 24. When the arm 25 is latched to the body 24 by the spring pin 27, the bolt 26 can be tightened. As it is tightened it will force the pump downward until it seals with the bottom of the incasing 20.

FIG. 6 shows a pump 12 within an incasing 20. Mounted on one side of the incasing 20 is a chamber 44 which can be made unitary with the incasing 20, or can be made as a separate piece and attached by any conventional means. At the top of the casing 42 is a door 37 which is hinged at 43 so the door can be opened or closed. The door 37 can be made of a mesh material, as shown in FIG. 7 to allow air to enter the chamber and eventually into the pump 12 as the piston 14 is raised. The mesh door 37 will also act as a filter to keep debris from inside the chamber 44 which might block the air intake 38 (see FIG. 3) to the pump 12.

Mounted in one side of the chamber 44 is an air intake pipe 39 which communicates with air intake 38 in the pump 12. When the piston 12 is forced into the up position, air will be pulled into chamber 44 through the door 37, and will enter aperture 40 in the end of the intake pipe 39. The air entering the intake pipe 39 will force the ball 41 against a stop 42. There will be enough room between the outside diameter of ball 41 and the inside of the intake pipe 39 to allow air to pass by the ball and enter the pump 12 through air intake 38. When the piston 12 is forced down by a vehicle or pedestrian pushing on flaps 2, plate 33 will force air through air intake 38 and into intake pipe 39 to force the ball 41 against air intake aperture 40 which will close the air intake.

Although the road vehicle actuated air compressor and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What we claim as my invention is:

1. A device for compressing air adapted to be mounted in a roadway and adapted for utilizing the weight of pedestrian or vehicular traffic flow to produce compressed air comprising:

a mounting casing having at least a pair of horizontal flange portions, each flange portion having a vertical wall depending therefrom, a slanted wall portion attached to each said vertical wall, and air passages connected to said slanted walls, at least one pump means for compressing air mounted in said casing, said pump means comprising a housing having a reciprocal piston positioned inside said housing, spring means for forcing said piston to an up position, a shaft attached to said piston and having a portion extending from a top of said housing, valve means positioned in a bottom portion of said housing, an air passage leading from said bottom of said housing to an air storage means, whereby when said portion extending from a top of said housing is compressed said piston will compress air within said housing and said air will pass through said valve means into said air passage and into said air storage means.

2. The device for compressing air as claimed in claim 1, wherein said valve means is a one way valve for allowing air to be moved out of said pump, but does not allow said air to enter said pump.

3. The device for compressing air as claimed in claim 1, wherein said mounting casing and said pump means have cooperating latch means for sealing said pump means within said mounting casing, said latch means comprising:

a body mounted on said pump means, an arm pivotably mounted on said body and movable from a first position to a second position, means for locking said arm in said second position, threaded means mounted on a free end for engaging a portion of said mounting casing, when said arm is in said second position and said threaded means is rotated against said portion of said mounting casing, said pump means will be forced into said mounting casing.

4. The device for compressing air as claimed in claim 1, wherein said mounting casing has a chamber mounted on one side thereof, said chamber has a door mounted at a top of said chamber, means on said door for allowing air to enter said chamber.

5. The device for compressing air as claimed in claim 4, wherein said mounting casing has an air valve positioned in a wall of said chamber, said air valve communicating with an air intake mounted in a side of said pump means, said air valve having means for preventing air from entering said air intake mounted in a side of said pump means when said pump means is compressing air.

6. The device for compressing air as claimed in claim 1, wherein a pair of pivoted flap means are mounted above said reciprocal piston, whereby when weight is placed on said flap means, said flap means press down said reciprocal piston and thereby compress air within said pump means.

7. The device for compressing air as claimed in claim 6, wherein each of said pair of pivoted flap means is mounted in an L-shaped holder at one end of said flap means, and means for securing another end of said flap means together, whereby when weight is placed on said flap means they will move downward in unison.

8. The device for compressing air as claimed in claim 7, wherein said means for securing another end of said flap means together is a pair of rods secured to a first holder, said flap means having apertures extending therethrough, free ends of said rods are received in said apertures, and second holder attached to said free ends.

\* \* \* \* \*